(12) United States Patent
Whitehead (10) Patent No.: US 7,505,924 B1
(45) Date of Patent: Mar. 17, 2009

(54) SERVICE SUBSCRIPTION SERVICE BUSINESS

(76) Inventor: Clay T. Whitehead, P.O. Box 8090, McLean, VA (US) 22106-8090

( * ) Notice: Subject to any disclaimer, the term of this patent is extended or adjusted under 35 U.S.C. 154(b) by 978 days.

(21) Appl. No.: 09/863,010

(22) Filed: May 23, 2001

Related U.S. Application Data (60) Provisional application No. 60/207,297, filed on May 30, 2000, provisional application No. 60/206,268, filed on May 23, 2000.

(51) Int. Cl.
*G06Q 30/00* (2006.01)

(52) U.S. Cl. .............................. 705/26; 705/14; 705/15; 705/27; 709/206; 725/36

(58) Field of Classification Search .................. 705/14, 705/26, 27; 709/206; 725/36
See application file for complete search history.

(56) References Cited

U.S. PATENT DOCUMENTS

| | | | |
|---|---|---|---|
| 5,375,055 A | 12/1994 | Togher et al. | |
| 5,790,642 A | 8/1998 | Taylor et al. | |
| 5,862,203 A | 1/1999 | Wulkan et al. | |
| 5,881,139 A | 3/1999 | Romines | |
| 5,931,901 A * | 8/1999 | Wolfe et al. ................. | 709/206 |
| 5,963,916 A * | 10/1999 | Kaplan ........................ | 705/26 |
| 5,995,602 A | 11/1999 | Johnson et al. | |
| 6,005,925 A | 12/1999 | Johnson et al. | |
| 6,005,926 A | 12/1999 | Mashinsky | |
| 6,047,274 A | 4/2000 | Johnson et al. | |
| 6,078,652 A | 6/2000 | Barak | |
| 6,519,571 B1 * | 2/2003 | Guheen et al. ................. | 705/14 |
| 6,704,930 B1 * | 3/2004 | Eldering et al. ............... | 725/36 |
| 6,925,444 B1 * | 8/2005 | McCollom et al. ............ | 705/14 |
| 7,200,566 B1 * | 4/2007 | Moore et al. ................... | 705/26 |
| 2001/0014868 A1 * | 8/2001 | Herz et al. ..................... | 705/14 |
| 2002/0026363 A1 * | 2/2002 | Dunaway, Jr. ................. | 705/15 |
| 2002/0033416 A1 * | 3/2002 | Gerszberg et al. ........... | 235/380 |

* cited by examiner

*Primary Examiner*—Yogesh C Garg
(74) *Attorney, Agent, or Firm*—Nixon & Vanderhye P.C.

(57) ABSTRACT

A service subscription service business is a service provided to individuals and businesses that finds a lowest-cost provider or providers for subscription products and services as well as for one-time purchases of products and services. The system preferably administers the consumer items over a global network such as the Internet. A user profile is compiled that relates to desired consumer items. The database of items available from product and service providers can be accessed, and relevant items are identified according to the user profile. If the user profile incorporates an automatic best choice service, the system automatically implements the relevant items and communicates the implemented relevant items to the user. Alternatively, if the user profile does not incorporate the automatic best choice service, the items are communicated to the user, and the user is given an opportunity to selectively implement the relevant items. The user profile may be compiled or supplemented by monitoring a pattern of consumer item use. Additionally, the consumer profile can be monitored according to user-entered parameters. With this system, a customer can be assured that products and services desired by the customer are being maintained at a best available cost.

16 Claims, 5 Drawing Sheets

SERVICE SUBSCRIPTION SERVICE BUSINESS

CROSS-REFERENCES TO RELATED APPLICATIONS

This application claims the benefit of U.S. Provisional Patent Application Ser. No. 60/206,268, filed May 23, 2000 and U.S. Provisional Patent Application Ser. No. 60/207,297, filed May 30, 2000, the entire contents of which are herein incorporated by reference.

STATEMENT REGARDING FEDERALLY SPONSORED RESEARCH OR DEVELOPMENT (NOT APPLICABLE)

BACKGROUND AND SUMMARY OF THE INVENTION

The present invention relates to a business method that can be conducted over a global network such as the Internet and, more particularly, to a method and system of administering consumer items including regularly purchased items or subscription items over a global network.

The system and method according to the invention provide a service to individuals and businesses that finds and, at the customer's option, automatically subscribes them to a lowest-cost provider for subscription-type consumer items such as but not limited to telephone, long distance, cellular phone, electricity, gas, home insurance, car insurance, cable TV, Internet access, magazine subscriptions, mortgages, travel, etc. The system can effect the same functionality for one-time purchase consumer items such as automobiles, household goods, office supplies, etc. so that the customer receives the best price at the time of purchase.

In a mortgage context, the system can be used to refinance a mortgage, where the system server compares available mortgage rates that suit the customer's circumstances, compares those rates with the existing rate, calculates the transaction costs of paying off the existing mortgage and closing the new one, and presents the customer with the results and if in accordance with the customer's profile, initiates the transaction. To purchase an automobile, the service can poll suppliers for cars meeting customer specifications, find the lowest price, and report the results to the customer at intervals or when a threshold has been reached. Optionally, it may initiate the transaction. Other examples include buying a service such as cellular phone service. When the customer can wait to initiate or renew a service, the system can poll and monitor service options and special offers, calculate the total cost of equipment and service over a selected time period, and report the most favorable results at intervals or report when a threshold has been reached. If the customer already has service and a cancellation charge may apply, that is factored into the calculations reported to the customer. The system can also be used for selecting investment vehicles. The customer's bank or brokerage account may have multiple options for holding cash and other assets that have differing interest rates and service charges. The system would identify and optionally select the best combination of such services. If the customer has multiple accounts, perhaps with different institutions, this optimization could be performed across vendors. If the customer provided or allowed the system to acquire the needed information, the system could also compare plans available from multiple institutions to see if the customer would benefit from establishing an account there while still preserving confidentiality.

The system maintains and continuously updates a database of services and prices and transaction costs, regularly monitors the customer's usage of each product or service, finds the lowest prices available to each customer for each service or product, and then switches the customer's account at the customer's option to the chosen service provider. Where multiple pricing plans are available from a single provider, the system analyzes the customer's pattern of use to determine which provider and pricing plan is most economic. The system can be offered directly to customers via Internet, mail and/or telephone and may also provide the functionality to other companies so that they can co-brand or private label the service.

The system provides the customer with the option of specifying criteria other than price in a user profile and selects the lowest-cost consumer items meeting those criteria. The system also gives the customer the option of consolidating billing for all services into a single bill.

The system expands on three trends underway on the Internet and other computer networks:

The regulatory mandate for competition in telecom and utility services makes it possible for a company to re-sell telecom, gas, and electricity services, buying at wholesale and marketing to customers at retail. Some of these companies provide one-stop shopping for telecom and utility services. Since most providers are reselling the service of well-established wholesalers, there may be little difference in the quality of service, and competition may be mainly on price;

Comparative shopping sites on the Internet give the customer comparative prices for various service providers. However, since prices are constantly changing, customers must keep checking comparisons for each service category and then initiate a change in service providers;

Consolidation of billing as a convenience to the customer. Bills designated by the customer are forwarded to the bill payer, which consolidates the bills into a single statement. The customer can control which bills are to be paid and when by visiting a single Internet site or by other means of communication.

The system according to the present invention takes a next step in this area, primarily via the Internet and other information networks by doing the comparative shopping for the customer, continually repeating the comparison to provide a menu of choices, identifying the lowest-cost option meeting the customer's requirements, automatically switching the customer's service to whichever service provider affords the best price, optionally consolidating billing for all services into a single bill, etc. All these activities may be accomplished utilizing computational and Internet equipment such as a PC, modem or other connection, browser, Internet appliance, etc. or by means of other information processing and communications means.

In an exemplary embodiment of the invention, a method of administering consumer items over a global network includes the steps of (a) compiling a user profile relating to desired consumer items, (b) accessing a database of items available from product and service providers, and identifying relevant items according to the user profile, (c) if the user profile incorporates an automatic best choice service, automatically implementing the relevant items, and communicating the implemented relevant items to the user, and (d) if the user profile does not incorporate the automatic best choice service, communicating the relevant items to the user, and enabling the user to selectively implement the relevant items. Step (a) may be practiced by monitoring a pattern of consumer item use and further according to user-entered parameters. The method may further include periodically repeating steps (b)-(d). The communicating in steps (c) and (d) are preferably, but not necessarily, performed via electronic mail or other means of communication. Related items that are available at low or no incremental cost due to bundling and the like may also be identified and communicated to the user. If a particular parameter in the user profile significantly affects the costs, the user can be notified and provided with an option to adjust the user profile.

In accordance with another exemplary embodiment of the invention, a method of obtaining and maintaining consumer items including products and services at a lowest available cost over a global network includes the steps of (a) compiling a user profile according to a pattern of customer use and user-entered parameters, (b) maintaining a database of items available from product and service providers, (c) accessing the database of items and identifying relevant items according to the user profile, (d) if the user profile incorporates an automatic best choice service, automatically implementing the relevant items, and communicating the implemented relevant items to the user, and (e) if the user profile does not incorporate the automatic best choice service, communicating the relevant items to the user, and enabling the user to selectively implement the relevant items.

According to still other exemplary embodiments of the invention, the invention is embodied in a computer system for administering consumer items and a computer program embodied on a computer-readable medium for administering consumer items. The computer system includes at least one user computer running a computer program that compiles the user profile relating to desired consumer items and accesses a database of items available from product and service providers. The computer program identifies relevant items according to the user profile. A system server runs a server program, wherein the user computer and the system server are interconnected by a computer network. The system server maintains at least a portion of the database of available items and effects implementing of the relevant items according to user preferences. The relevant items may be automatically implemented according to the automatic best choice service, or the user may be provided an opportunity to selectively implement the relevant items.

BRIEF DESCRIPTION OF THE DRAWINGS

These and other aspects and advantages of the present invention will be described in detail with reference to the accompanying drawings, in which.

DETAILED DESCRIPTION OF PREFERRED EMBODIMENTS

The consumer item administration system implemented in the diagrams of FIGS. 1-4 is preferably a browser-based or other user interface system in which a program running on a user's computer (the user's web browser) requests information from a server program running on a system server. The system server sends the requested data back to the browser program, and the browser program then interprets and displays the data on the user's computer screen. The process is as follows (or performs the same overall basic function):

1. The user runs a web browser program on his/her computer.
2. The user connects to the server computer (e.g., via the Internet). Connection to the server computer may be conditioned upon the correct entry of a password as is well known. Alternatively, the service may not entail a server but may be embodied in software provided to the customer to run on his own computer or other device, or some combination of software and server functionality
3. The user requests a page from the server computer. The user's browser sends a message to the server computer that includes the following:
   the transfer protocol (e.g., http://); and
   the address, or Uniform Resource Locator (URL).
4. The server computer receives the user's request and retrieves the requested page, which is composed, for example, in HTML (Hypertext Markup Language).
5. The server then transmits the requested page to the user's computer.
6. The user's browser program receives the HTML text and displays its interpretation of the requested page.

Thus, the browser program on the user's computer sends requests and receives the data needed to display the HTML page on the user's computer screen. This includes the HTML file itself plus any graphic, sound and/or video files mentioned in it. Once the data is retrieved, the browser formats the data and displays the data on the user's computer screen. Helper applications, plug-ins, and enhancements such as Java™ enable the browser, among other things, to play sound and/or display video inserted in the HTML file. The fonts installed on the user's computer and the display preferences in the browser used by the user determine how the text is formatted.

If the user has requested an action that requires running a program (e.g., a search), the server loads and runs the program. This process usually creates a custom HTML page "on the fly" that contains the results of the program's action (e.g., the search results), and then sends those results back to the browser.

Browser programs suitable for use in connection with the consumer item administration system of the present invention include Netscape® Navigator available from Netscape® Communications Corporation and Internet Explorer available from Microsoft® Corp.

While the above description contemplates that each user has a computer running a web browser, it will be appreciated that more than one user could use a particular computer terminal or that a "kiosk" at a central location (e.g., a cafeteria, a break area, etc.) with access to the system server could be provided.

It will be recognized by those in the art that various tools are readily available to create web pages for accessing data stored on a server and that such tools may be used to develop and implement the consumer item administration system described below and illustrated in the accompanying drawings. As noted, the system is not limited to use via web pages. The server may download a substantial amount of the functionality into the PC or other terminal. "Pages" may consist of data inserted into a display or software program running on the user's terminal. The terminal may be a PALM PILOT®, telephone or any number of other devices with multi-purpose or single-purpose functions.

Figure 5:
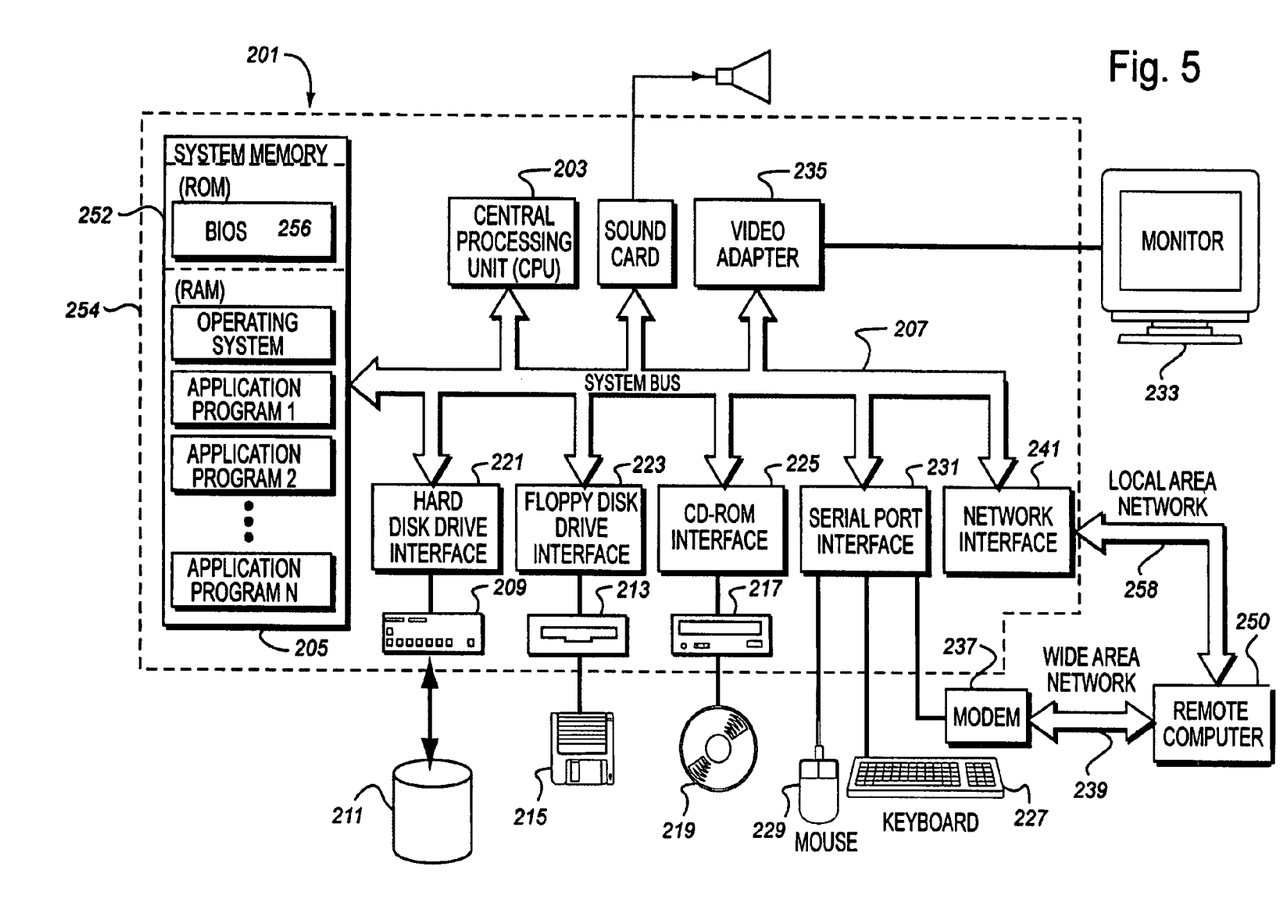
FIG. 5 is a schematic illustration of a computer system.

FIG. 5 generally illustrates a computer system 201 suitable for use as the client and server components of the consumer item administration system. It will be appreciated that the client and server computers will run appropriate software and that the client and server computers may be somewhat differently configured with respect to the processing power of their respective processors and with respect to the amount of memory used. Computer system 201 includes a processing unit 203 and a system memory 205. A system bus 207 couples various system components including system memory 205 to processing unit 203. System bus 207 may be any of several types of bus structures including a memory bus or memory controller, a peripheral bus, and a local bus using any of a variety of bus architectures. System memory 205 includes read only memory (ROM) 252 and random access memory (RAM) 254. A basic input/output system (BIOS) 256, containing the basic routines that help to transfer information between elements within computer system 201, such as during start-up, is stored in ROM 252. Computer system 201 further includes various drives and associated computer-readable media. A hard disk drive 209 reads from and writes to a (typically fixed) magnetic hard disk 211; a magnetic disk drive 213 reads from and writes to a removable "floppy" or other magnetic disk 215; and an optical disk drive 217 reads from and, in some configurations, writes to a removable optical disk 219 such as a CD ROM or other optical media. Hard disk drive 209, magnetic disk drive 213, and optical disk drive 217 are connected to system bus 207 by a hard disk drive interface 221, a magnetic disk drive interface 223, and an optical drive interface 225, respectively. The drives and their associated computer-readable media provide nonvolatile storage of computer-readable instructions, SQL-based procedures, data structures, program modules, and other data for computer system 201. In other configurations, other types of computer-readable media that can store data that is accessible by a computer (e.g., magnetic cassettes, flash memory cards, digital video disks, Bernoulli cartridges, random access memories (RAMs), read only memories (ROMs) and the like) may also be used.

A number of program modules may be stored on the hard disk 211, removable magnetic disk 215, optical disk 219 and/or ROM 252 and/or RAM 254 of the system memory 205. Such program modules may include an operating system providing graphics and sound APIs, one or more application programs, other program modules, and program data. A user may enter commands and information into computer system 201 through input devices such as a keyboard 227 and a pointing device 229. Other input devices may include a microphone, joystick, game controller, satellite dish, scanner, or the like. These and other input devices are often connected to the processing unit 203 through a serial port interface 231 that is coupled to the system bus 207, but may be connected by other interfaces, such as a parallel port interface or a universal serial bus (USB). A monitor 233 or other type of display device is also connected to system bus 207 via an interface, such as a video adapter 235.

The computer system 201 may also include a modem 237 or other means for establishing communications over the wide area network 239, such as the Internet. The modem 237, which may be internal or external, is connected to the system bus 207 via the serial port interface 231. A network interface 241 may also be provided for allowing the computer system 201 to communicate with a remote computing device 250 via a local area network 258 (or such communication may be via the wide area network 239 or other communications path such as dial-up or other communications means). The computer system 201 will typically include other peripheral output devices, such as printers and other standard peripheral devices.

As will be understood by those familiar with web-based forms and screens, users may make menu selections by pointing-and-clicking using a mouse, trackball or other pointing device, or by using the TAB and ENTER keys on a keyboard. For example, menu selections may be highlighted by positioning the cursor on the selections using a mouse or by using the TAB key. The mouse may be left-clicked to select the selection or the ENTER key may be pressed. Other selection mechanisms including voice-recognition systems, touch-sensitive screens, etc. may be used, and the invention is not limited in this respect.

Figure 1:
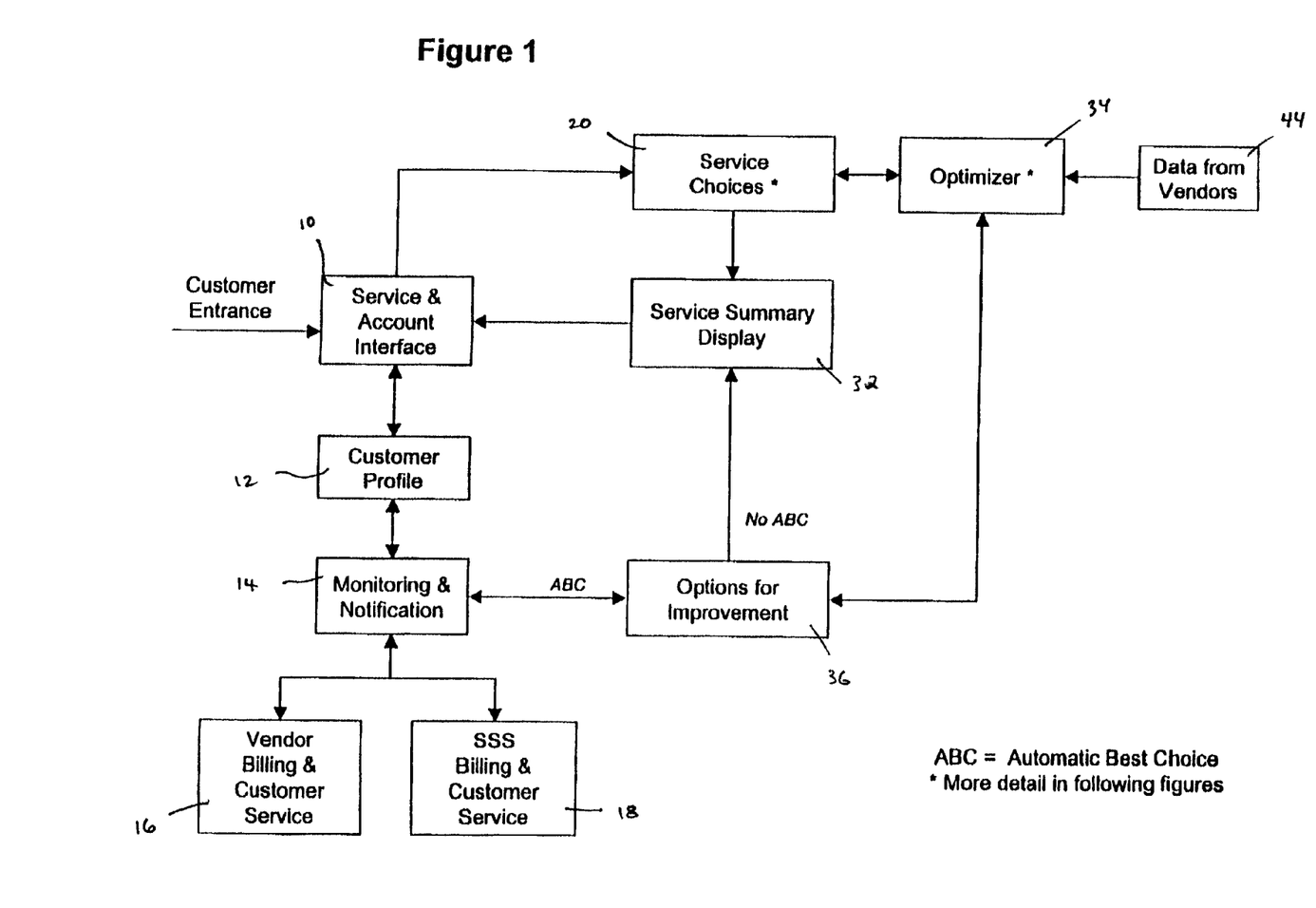
FIG. 1 is a flow diagram of the basic procedure and system according to the present invention.

FIG. 1 is a flow diagram of the basic procedure and system according to the present invention. The customer accesses the system via a system homepage including a service and account interface 10, where the customer controls all decisions and information displays. Here, the customer can select services, see options for each service from vendors, select options, choose options individually or select the automatic best choice (ABC) service, wherein relevant consumer items identified by the system according to the user profile are automatically implemented. Changes made in the interface when executed by the customer go into a customer profile 12. The customer profile 12 contains all needed information about the customer and the customer-specific item parameters. The system itself may embody multiple levels of service, and the customer may elect to use some or all of the system features.

The system monitors the customer's usage of each consumer item and periodically re-optimizes according to usage patterns at a monitoring and notification location 14. Vendors are notified of service changes requested by the customer or implemented by the ABC service. The customer may choose to be billed by the vendor 16 or to have bills consolidated and be billed by the billing system 18 of the service subscription service or some other billing service.

Figure 2:
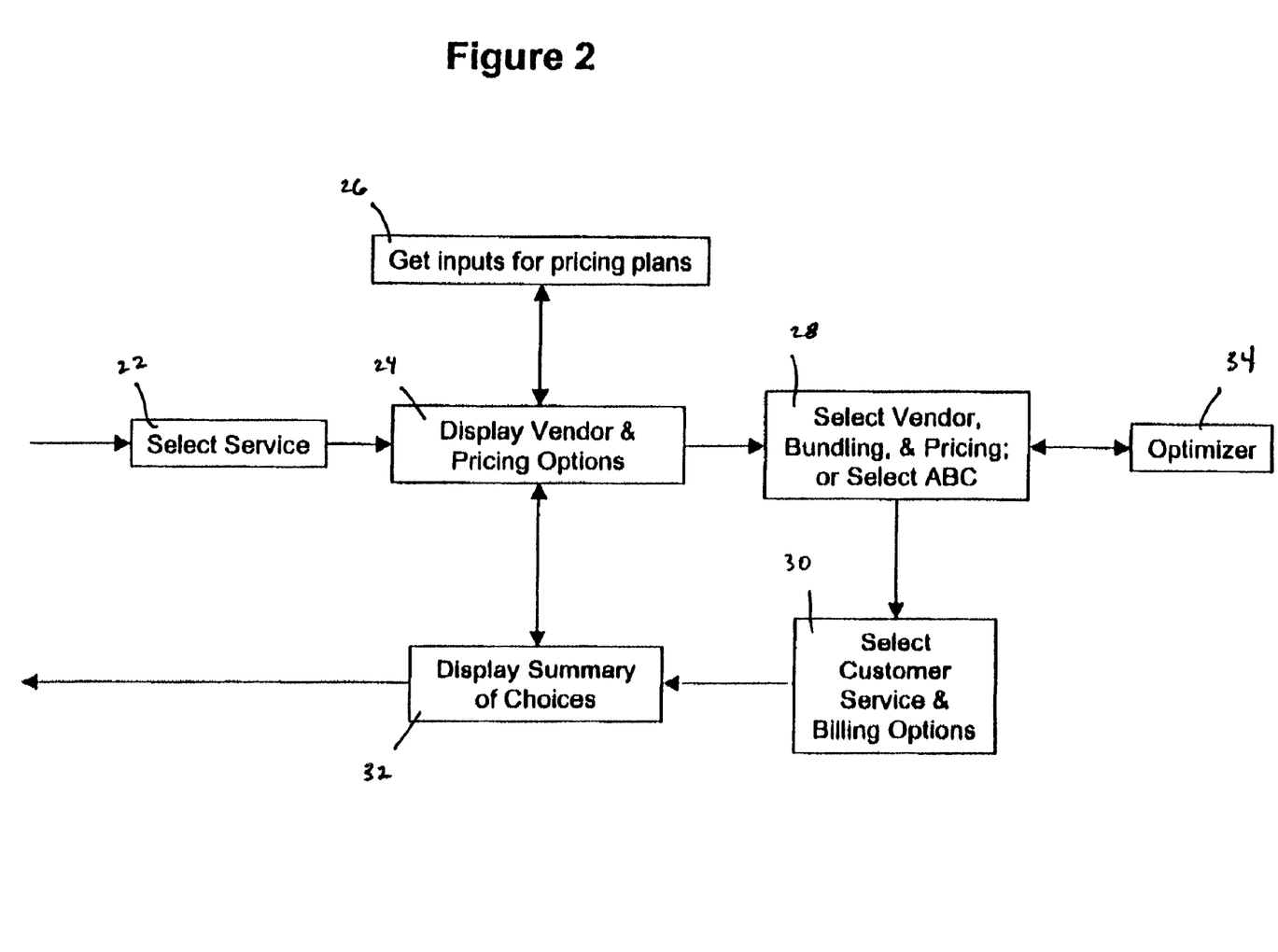
FIG. 2 shows the customer choices function in the flow diagram of FIG. 1.

The service choices function 20 is shown in more detail in FIG. 2. For each service selected at 22, the customer can see vendor service and pricing options 24, supply initial information to suggest a best service plan 26, select the vendor and bundling and pricing plan for each service 28, or select the ABC service. The customer can choose customer service and billing options 30 as available. If there are added costs, this is fed into the service parameters and optimizer for a re-optimization. A summary of choices is displayed at 32, and the customer can reiterate the process or return to the account interface. The optimizer 34 shows the customer which vendors and which plans provide the lowest cost for the service and usage parameters supplied by the customer and/or monitored by the system. The optimizer 34 determines a least cost service for an individual service or for bundles of services, either for a single vendor or across all possible vendors. Options for improvement 36 (FIG. 1) are automatically implemented if the customer has chosen the automatic best choice service. Non-ABC customers are notified of options for improvement via the account interface, e-mail and/or other means.

Figure 3:
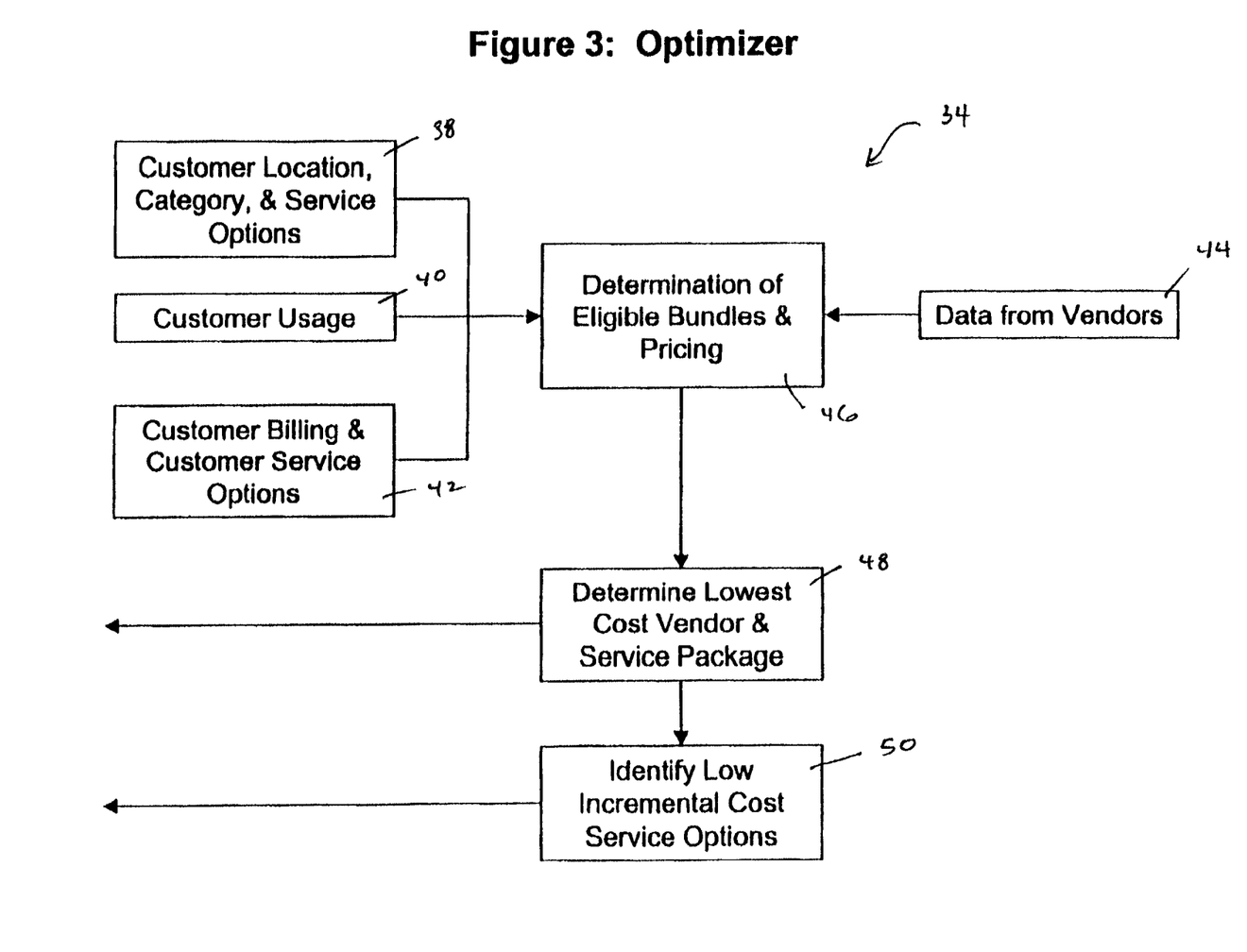
FIG. 3 shows the optimizer function from FIGS. 1 and 2 in more detail.

The optimizer function in FIGS. 1 and 2 is shown in more detail in FIG. 3. The optimizer 34 takes into account all information that could affect the cost and quality of service for each service. This could include customer location, type or category of customer or service options 38, usage patterns 40, customer service and billing options 42, etc. Data from vendors, regulatory authorities, and other sources 44 is compared with the customer information to determine which services, bundles, pricing plans and other service features are eligible for meeting the customer needs 46. From this data, a least-cost package is determined at 48, consistent with any specification of vendor or service made by the customer. The customer may also designate "good enough" or "satisfactory" solutions via price ranges and/or deviations from a least-cost or optimized plan. With service bundling by vendors, there may be additional services or options available at low incremental costs, and such additional services or options are identified and reported to the customer at 50. All communications between the system, the customers and vendors preferably are by electronic means using whatever formats best facilitate the service and using conventional equipment and software.

Figure 4:
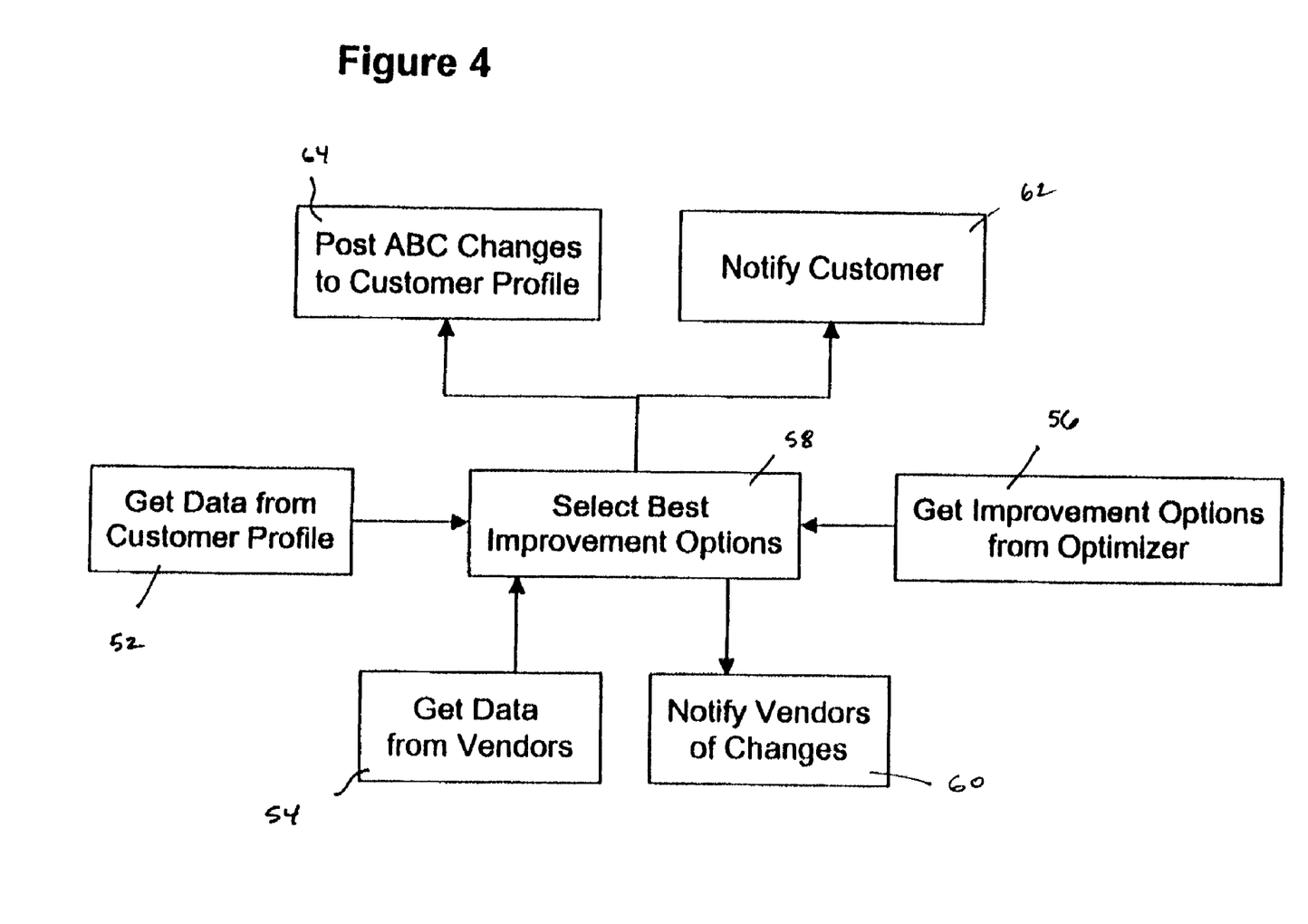
FIG. 4 shows the monitoring and notification systems of the present invention.

Referring to FIG. 4, the system regularly monitors customer usage patterns via 52 and changes in services and pricing from the vendors via 54. The optimizer 34 obtains improvement options 56 and determines whether any changes would lower the cost of the service 58. If the ABC option is chosen by the customer, the service packages are automatically implemented, and the vendors are notified 60. Otherwise, the customer is notified 62 and provided with an opportunity to selectively implement identified relevant items. The system notifies the vendors of any changes made by ABC or the customer 64 and also monitors implementation of changes to ensure that the vendors are in compliance with service choices.

With the method and system of administering consumer items according to the present invention, customers can be comforted that they are getting subscription services and the like according to their personal user profile at a lowest available cost. Of course, the system according to the invention can also be used on a one-time basis to enable a customer to purchase one-time products and services according to pre-defined criteria such as user-entered parameters at a least cost. In this invention, the phrase "consumer items" refers to both one-time purchase products and services as well as subscription-type products and services. The resulting system is easy to use and maintain, and with the ABC service option selected, customers can be assured that they are automatically getting desired products and services at a best available cost.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A computer-implemented method of administering consumer items over a global network, the method comprising:
   (a) a user compiling a user profile relating to desired consumer items, via a user computer, the user profile being compiled according to parameters entered by the user via the user computer;
   (b) the user computer accessing via the global network a database of items available from product and service providers stored on a system server, and identifying relevant items according to the user profile, the relevant items being those that most benefit the user cost-wise;
   (c) providing the user with an option selectable via the user computer to incorporate in the user profile an automatic best choice service;
   (d) if the user profile incorporates the automatic best choice service, the system server automatically accepting the relevant items without user intervention, and communicating the accepted relevant items to the user; and
   (e) if the user profile does not incorporate the automatic best choice service, the system server communicating the relevant items to the user, and enabling the user to selectively accept the relevant items.

2. A method according to claim 1, wherein step (a) is practiced by monitoring a pattern of consumer item use.

3. A method according to claim 1, further comprising periodically repeating steps (b)-(e).

4. A method according to claim 1, wherein in step (b), the relevant items are identified based on a lowest cost consistent with the user profile.

5. A method according to claim 1, wherein the communicating in steps (d) and (e) are performed via electronic mail.

6. A method according to claim 1, wherein the consumer items comprise subscription services.

7. A method according to claim 1, practiced on a one-time basis to effect a purchase of a particular product.

8. A method according to claim 1, wherein step (d) is practiced by identifying related items separately and in combinations that are available at low incremental cost, and communicating the identified related items to the user.

9. A computer-implemented method of obtaining and maintaining consumer items including products and services at a lowest available cost over a global network, the method comprising:
   (a) a user compiling a user profile according to a pattern of customer use and user-entered parameters, via a user computer, the user-entered parameters being entered via the user computer;
   (b) a system server maintaining a database of items available from product and service providers;
   (c) the user computer accessing the database of items via the global network and identifying relevant items according to the user profile, the relevant items being those that most benefit the user cost-wise;
   (d) providing the user with an option selectable via the user computer to incorporate in the user profile an automatic best choice service;
   (e) if the user profile incorporates the automatic best choice service, the system server automatically accepting the relevant items without user intervention, and communicating the accepted relevant items to the user; and
   (f) if the user profile does not incorporate the automatic best choice service, the system server communicating the relevant items to the user, and enabling the user to selectively accept the relevant items.

10. A method according to claim 9, further comprising periodically repeating steps (b)-(f).

11. A method according to claim 9, wherein in step (c), the relevant items are identified based on a lowest cost consistent with the user profile.

12. A method according to claim 9, wherein the communicating in steps (e) and (f) are performed via electronic mail.

13. A method according to claim 9, wherein the consumer items comprise subscription services.

14. A method according to claim 9, practiced on a one-time basis to effect a purchase of a particular product.

15. A computer system for administering consumer items, the computer system comprising:
   at least one user computer running a computer program that compiles a user profile relating to desired consumer items and accesses a database of items available from product and service providers, the computer program identifying relevant items according to the user profile, the relevant items being those that most benefit the user cost-wise, wherein the user profile is compiled according to parameters entered by the user via the user computer; and a system server running a server program, the at least one user computer and the system server being interconnected by a computer network, the system server maintaining at least a portion of the database of available items, providing the user with an option selectable via the user computer to incorporate in the user profile an automatic best choice service, and effecting acceptance of the relevant items according to user preferences, wherein if the user profile incorporates the automatic best choice service, the computer program automatically accepting the relevant items without user intervention, and communicating the accepted relevant items to the user, and wherein if the user profile does not incorporate the automatic best choice service, the computer program communicating the relevant items to the user, and enabling the user to selectively accept the relevant items.

16. A computer program embodied on a computer-readable medium for administering consumer items via a user computer, the computer program comprising:

means for compiling a user profile relating to desired consumer items based at least on user-entered parameters, entered via the user computer;

means for accessing a database of items available from product and service providers, for identifying relevant items according to the user profile, and for providing the user with an option selectable via the user computer to incorporate in the user profile an automatic best choice service, the relevant items being those that most benefit the user cost-wise;

wherein if the user profile incorporates the automatic best choice service, means for automatically accepting the relevant items without user intervention, and for communicating the accepted relevant items to the user; and if the user profile does not incorporate the automatic best choice service, means for communicating the relevant items to the user, and for enabling the user to selectively accept the relevant items.

* * * * *